(12) United States Patent  (10) Patent No.: US 7,609,198 B2
Chang (45) Date of Patent: Oct. 27, 2009

(54) APPARATUS AND METHOD FOR RADAR IMAGING BY MEASURING SPATIAL FREQUENCY COMPONENTS

(75) Inventor: Donald Chin-Dong Chang, Thousand Oaks, CA (US)

(73) Assignee: Spatial Digital Systems, Inc., Chatsworth, CA (US)

( * ) Notice: Subject to any disclaimer, the term of this patent is extended or adjusted under 35 U.S.C. 154(b) by 0 days.

(21) Appl. No.: 12/122,566

(22) Filed: May 16, 2008

(65) Prior Publication Data

US 2008/0291077 A1 Nov. 27, 2008

Related U.S. Application Data

(60) Provisional application No. 60/930,955, filed on May 21, 2007.

(51) Int. Cl.
*G01S 13/00* (2006.01)
(52) U.S. Cl. .................................. 342/59; 342/179
(58) Field of Classification Search .................. 342/59, 342/179
See application file for complete search history.

(56) References Cited

U.S. PATENT DOCUMENTS 5,311,183 A * 5/1994 Mathews et al. .......... 342/26 B
6,388,606 B1 * 5/2002 Keydel et al. ............. 342/25 R
2004/0178951 A1 * 9/2004 Ponsford et al. ............ 342/192
2006/0170584 A1 8/2006 Romero et al.
2007/0109177 A1 5/2007 Baath et al.
2007/0159376 A1 * 7/2007 Abatzoglou et al. ....... 342/25 R

* cited by examiner

*Primary Examiner*—Thomas H Tarcza
*Assistant Examiner*—Timothy A Brainard
(74) *Attorney, Agent, or Firm*—O'Melveny & Myers LLP

(57) ABSTRACT

A radar imaging system is provided that directly measures the spatial frequency components of a scene via digital-beam-forming techniques applied along the cross-track dimension. Separate transmit and receive antennas provide increased integration time for the receive function, thus improving the signal-to-noise ratio. A segmented receive antenna is employed and processed as a series of interferometers sensitive to spatial frequency components of the scene corresponding to the separation between pairs of antenna elements. Range gating is used in the along-track dimension to divide the return from an illuminated swath into multiple range bins that may be processed independently. The system provides an improved signal-to-noise ratio and lends significant flexibility to the image formation process, improving the quality of the radar imaging. An embodiment having multiple transmit antennas is also provided that enables the generation of three-dimensional stereoscopic radar images.

29 Claims, 8 Drawing Sheets

PRIOR ART

APPARATUS AND METHOD FOR RADAR IMAGING BY MEASURING SPATIAL FREQUENCY COMPONENTS

RELATED APPLICATION DATA

This application claims the benefit, pursuant to 35 U.S.C. § 119(e), of U.S. provisional application Ser. No. 60/930,955, filed May 21, 2007.

BACKGROUND OF THE INVENTION

1. Field of the Invention

The present invention relates to forward-looking radar imaging systems. In particular, it relates to radar imaging systems that use digital-beam-forming techniques to measure the spatial frequency components of a scene in the cross-track direction.

2. Description of Related Art

Conventional forward-looking imaging radars are widely used for aircraft-landing and vehicle-navigation applications. In such systems, a mechanically gimbaled antenna aperture is usually mounted on the front of an aircraft or other vehicle, and it is generally used for both transmit and receive functions. The antenna is pointed at a fixed elevation angle toward a spot in front of and below the vehicle. The mechanical gimbals allow the antenna to be scanned azimuthally along a cross track, perpendicular to the direction of motion of the vehicle. For each azimuth position along a cross-track scan, a radio-frequency pulse or series of signal waveforms is transmitted from the antenna and scatters off of targets in the illuminated area with some of the scattered energy returning to the antenna. Objects closer to the antenna will return an echo before those that are farther away. Thus, dividing radar returns into time bins based on the timing of the echo return is equivalent to dividing them into range bins reflecting the distance to the scattering target. The maximum resolution of the imaging radar in the along-track direction thus depends on how precisely this range gating can be performed, and this is largely a function of the transmit waveform bandwidth.

In the cross-track, or azimuth dimension, the resolution is primarily dictated by the size of the aperture, with a larger aperture creating a smaller beam footprint that is scanned along the cross-track direction. As the antenna is scanned cross track, pulses or radar waveforms are transmitted at the pulse repetition frequency (PRF) to acquire a series of returns from each of the beam footprints along the cross track scan length. Thus for each scan, a two-dimensional image is constructed with pixels in the along-track direction resolved by range gating and pixels in the cross-track direction resolved by aperture size and the PRF rate.

One drawback of this conventional approach is that the antenna gimbals add weight and complexity to the system. The scanning process itself also adds aberrations due to the fact that the platform moves between the beginning and end of the scan. Furthermore, all spectral components of the scene are integrated in the direction of the scanning pencil beam, requiring a Fourier transform of the received signals before efficient spatial spectral filtering can be performed. Accordingly, it would be useful to provide a system that uses one or more fixed antennas, that can acquire an entire scene at one time, thereby reducing motion-induced aberrations, and that acquires spatial frequency spectra directly, improving signal-to-noise ratios and presenting data in a form readily amenable to spectral processing.

SUMMARY OF THE INVENTION

A forward-looking radar imaging system is provided that directly measures the spatial frequency components of a scene via digital-beam-forming techniques applied along the cross-track dimension. Processing in the range or along-track direction proceeds via range gating of an appropriately chosen pulsed transmit waveform. A segmented receiving antenna is operated as an interferometer to acquire spatial frequency information directly and simultaneously for an entire swath illuminated by a broad-beam transmit antenna. Such a system provides an improved signal-to-noise ratio, eliminates time skew across the swath, and enables a high degree of flexibility in spatial frequency-domain filtering and image processing, resulting in higher quality images.

An embodiment of an imaging radar in accordance with the present invention includes a separate transmit and receive antenna. The transmit antenna is chosen to illuminate a broad target swath on the ground in front of and below the antenna. Scattered returns from targets within the swath are intercepted by the receive antenna. The receive antenna includes a number of independent elements, each of which simultaneously produces a receive signal in response to the scattered return. The receive signals from each of the elements of the receive antenna are routed to a range processor that splits each of the signals into range bins corresponding to different distances from the antenna in the along-track (range/elevation) direction. The range processor employs matched filter processing and may be implemented in the frequency domain. The radar return signals are continuously passed through a short-time-window fast Fourier transform (FFT) processor, and the output spectra are multiplied by a stored spectrum of the transmitted radar waveforms. The product spectrum is then converted back to the time domain via inverse fast Fourier transform (IFFT) processing. The individual output components of the IFFT correspond to the returned radar signal intensity of the corresponding range bins. When sixty-four-point FFTs and IFFTs are used, at least sixty-four sets of range bin data are output from the range processing block.

Each range bin includes a full set of azimuth signals corresponding to each of the antenna array elements. On a per-range-bin basis, the azimuth signals are routed to a modulation-transfer-function (MTF) processor. The MTF processor is adapted to correlate all of the azimuth signals against one-another to produce an autocorrelation of the receive array aperture. In this manner, the elements of the receive aperture act as a series of interferometers oriented in the azimuth direction, each sensitive to certain spatial frequency components corresponding to the distance between antenna elements acting as an interferometer. The azimuth signals within each range bin may be processed sequentially, or by adding multiple MTF processors, can be processed in parallel, enabling higher radar repetition frequencies. For example, if the range processor divides signals into N range bins, N MTF processors can be operated in parallel to process the azimuth data, where N is a positive integer.

In a regular linear array antenna in which all the elements are regularly spaced by one unit, there are a large number of element pairs separated by a distance of one unit, fewer pairs of elements separated by a distance of two units, and only one pair spaced by the maximum number of units, i.e., the full length of the array. Thus, the large number of closely spaced pairs produces redundant samples of low spatial frequencies corresponding to large-scale features in the target region. Only one pair is sensitive to the highest spatial frequencies corresponding to the smallest resolvable features in the target region. It is possible to remove elements from such a redundant array in order to minimize the number of pairs spaced by the same distance and thus sampling the same spatial frequency components. When such elements are removed, a minimally redundant array (MRA) is achieved with little or no spatial-frequency-sampling redundancy. An example of such an MRA is described below with reference to FIG. 4B. Both imaging radar systems that include an MRA receive array and those that include a fully-populated array fall within the scope and spirit of the present invention.

After autocorrelation in the MTF processor, the spatial-frequency spectral signals corresponding to the processed azimuth signals of a selected range bin are in an ideal form for applying optional spatial frequency filtering. In an embodiment of the present invention, the MTF processor further includes a spectral weighting unit that is adapted to apply complex weighting factors to each of the components of the MTF signal. These factors may suppress or enhance signals having a particular spectral frequency character. For example, the weighting factors may be selected to operate as a low-pass filter, rejecting high-spatial-frequency components of the MTF signal. This will have the effect of smoothing the reconstructed image of the scene. On the other hand, the weighting factors can be adapted to produce a high-pass filter that will tend to act as a sharpening filter, enhancing edges in the reconstructed image of the scene. Other filter structures, such as band pass, are also possible by varying the weighting factors.

The signals from the MTF processor, after optional filtering, are routed to a Fourier transform processor that performs an inverse Fourier transform to generate an azimuth image slice. Similar azimuth slices are created for each of the range slices, and an image processor stacks the azimuth slices together to create a two-dimensional image of the scene.

In an alternative embodiment of an imaging radar in accordance with the present invention, two spatially separated transmit antennas are provided, one to the right and the other to the left of the receive antenna array. Radar waveforms are transmitted alternately from the left and right transmit antennas. Because a large portion of the swath illuminated by the left transmit antenna will overlap with the swath illuminated by the right transmit antenna, the radar returns from the two separated antennas can be used to generate a three-dimensional stereo image of the scene. The spacing of the two transmit sources will dictate the depth of three-dimensional resolution in elevation and azimuth.

From the foregoing discussion, it should be clear that certain advantages have been achieved for an imaging radar system that directly measures spatial frequency components of a target region. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides a radar imaging system that directly measures the spatial frequency components of a scene via digital-beam-forming techniques applied along the cross-track dimension. Range gating is used in the along-track dimension to divide the return from an illuminated swath into multiple range bins that may be processed independently. The system provides an improved signal-to-noise ratio and lends significant flexibility to the image formation process, improving the quality of the radar imaging.

Figure 1:
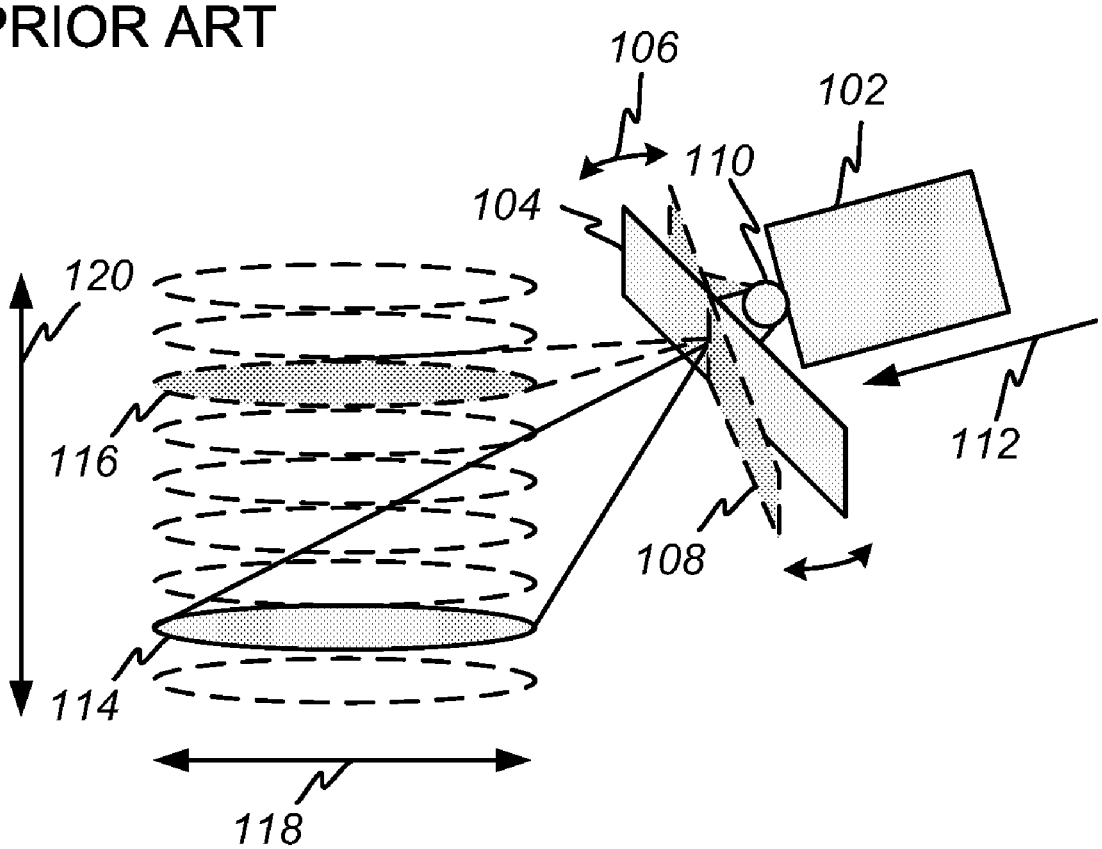
FIG. 1 depicts a conventional forward-looking radar system employing a gimbaled transmit/receive antenna.

FIG. 1 depicts a conventional forward-looking vehicle-mounted imaging radar system employing a gimbaled antenna. A vehicle 102 moves in the direction indicated at 112. An antenna 104 is mounted to the front of the vehicle 102 on gimbals 110 that allow the antenna to be moved back and forth in azimuth, as indicated at 106. The antenna 104 is used for both transmit and receive. In transmit, the antenna 104 illuminates a spot 114 on the ground ahead of and below the vehicle 102. The echo returning from scattering targets within the illuminated spot 114 return to the antenna 104, and range gating is used to resolve the location of scattering targets along the range or along-track direction indicated at 118. The gimbals 110 rotate the antenna 104 to sweep the illuminated spot along a swath of ground. An alternate position of the antenna during a scan is indicated by the dashed FIG. 108, showing illumination of a ground spot 116. As the antenna is mechanically steered to sweep out a swath in the azimuth or cross-track direction indicated at 120, repeated radar waveforms are transmitted and received. The locations of scattering targets in azimuth are determined by the pointing of the antenna and the width of the beam spot on the ground, which in turn is determined by the size of the antenna aperture. An antenna that extends farther in the cross-track direction will produce a spot with a narrower cross-track width, thus increasing the resolution.

A conventional system such as the one depicted in FIG. 1 has several drawbacks. In particular, the mechanical steering of the antenna increases weight and complexity and requires additional support structure to prevent the antenna from warping or deforming during scans. Furthermore, during the time required to perform an antenna scan, the vehicle is moving, and the acquired two-dimensional image must be corrected for this motion, which may not be known to high precision. In addition, the scattered field returned to the antenna is integrated across the entire length of the aperture, requiring Fourier-transform processing before spatial filtering can be applied. This process can add noise and reduce the overall quality of the image.

Figure 2:
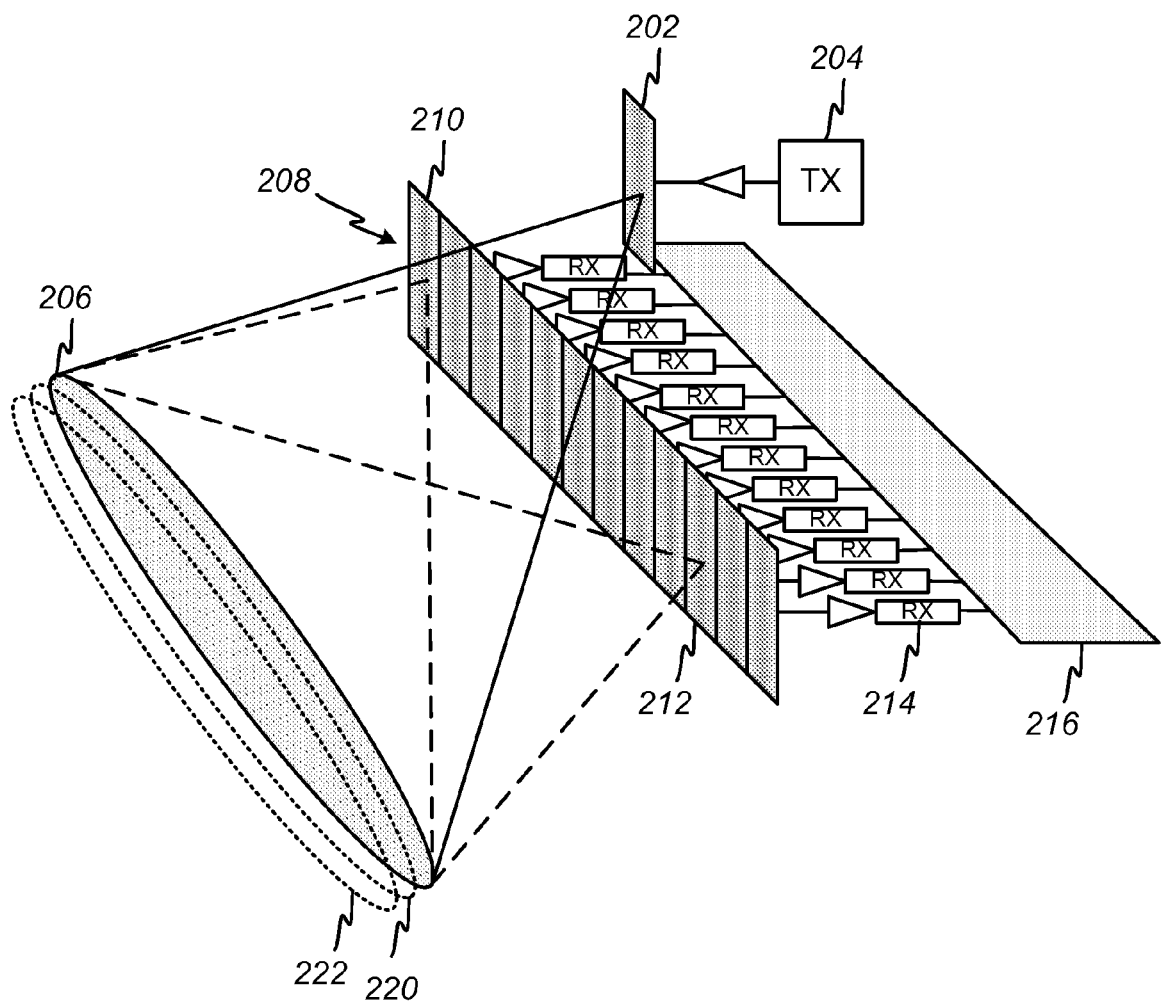
FIG. 2 depicts an embodiment of a forward-looking radar system in accordance with the present invention.

FIG. 2 presents a schematic diagram of an embodiment of a forward-looking imaging radar in accordance with the present invention. The antenna is divided into a transmit antenna 202 and a receive antenna 208 that are both fixed in place and mounted at the front of a vehicle. A transmitter 204 drives a radar pulse to the transmit antenna 202, illuminating a broad swath 206 on the ground in front of and below the vehicle. Unlike in a conventional forward-looking radar, the entire ground swath is illuminated simultaneously by the low-gain transmit antenna 202 rather than piece-by-piece during an azimuth scan. The receive antenna 208 is a segmented array aperture comprising a number of individual radiating elements, e.g., 210, and 212. The echo from the illuminated swath 206 is received by all elements of the receive array 208 simultaneously. The transmitter 204 fires successive pulses at the PRF rate, illuminating overlapping swaths 220 and 222 in the along-track direction. Range gating is used to differentiate echoes from scattering targets in the along-track direction, allowing integration of multiple looks at a given range bin to improve the signal-to-noise ratio.

Figure 3:
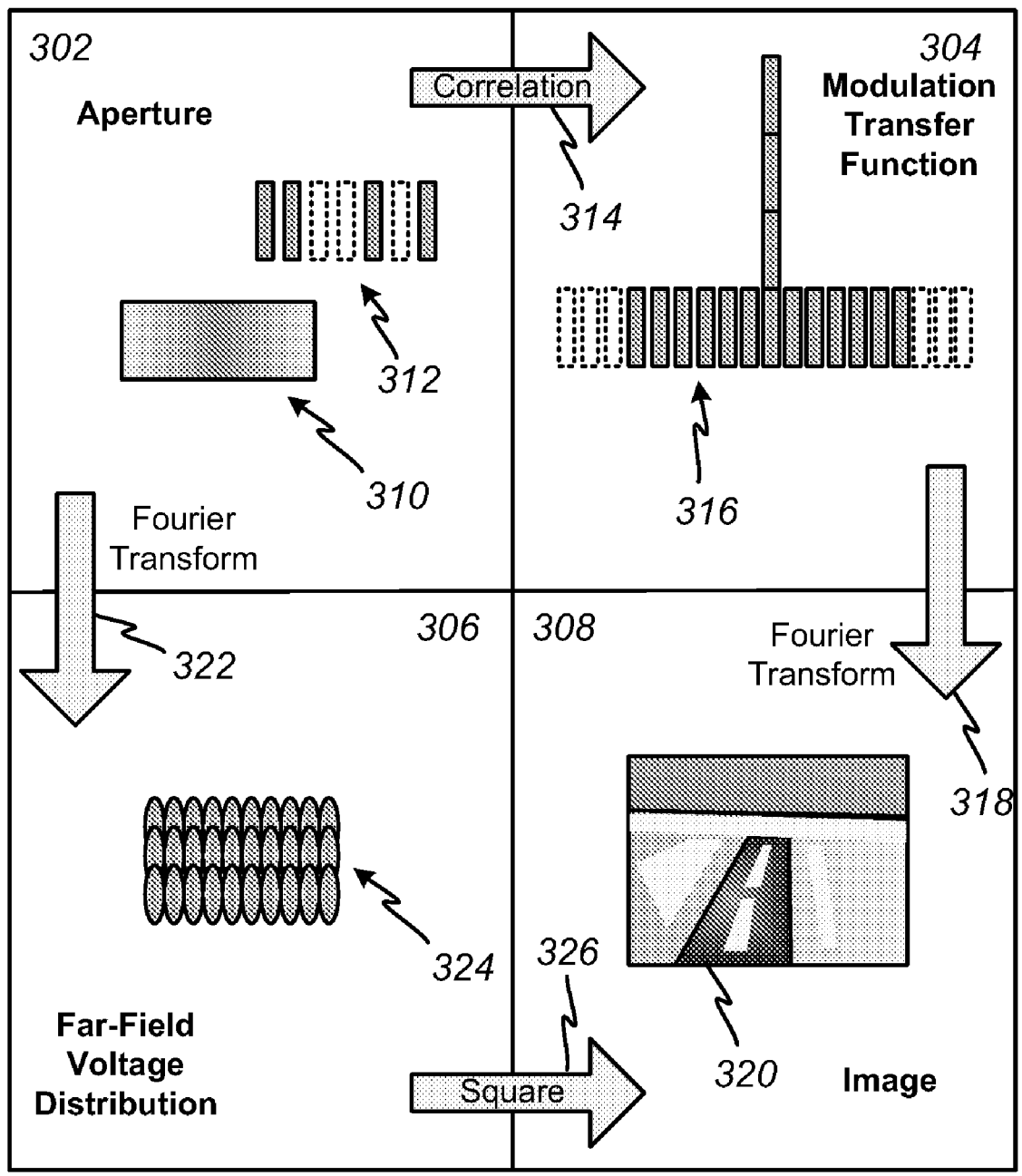
FIG. 3 presents a schematic comparison of a conventional image-processing method and a spatial-frequency-processing method in accordance with the present invention.

The received intensity at each of the elements is processed individually by separate receive channels, e.g., 214. The individual element signals are then passed along to an imaging processor 216, described more fully below. Unlike a conventional radar system that would then take the received electric field, perform a Fourier transform to recover the far-field voltage distribution, and then square this to generate an intensity image of the scene, the present system instead operates in the frequency domain by operating the receive antenna as a series of interferometers. FIG. 3 provides an illustration of this technique.

FIG. 3 depicts the conventional processing path for producing an image from radar returns as well as the processing path employed by an embodiment of a radar system in accordance with the present invention. The upper left quadrant 302 depicts a radar aperture as a single aperture or phased array 310 or as a sparse array 312, discussed in more detail with reference to FIGS. 4A-B. Conventional processing proceeds to the lower left quadrant 306 by performing a Fourier transform 322 on the returns from the scanned swath in order to recover the far-field voltage distribution, shown schematically at 324. Taking the square 326 of the voltage distribution on a pixel-by-pixel basis over the field of view then creates an image of the scene 320 that is a pixel-by-pixel map of reflected signal intensity.

An alternative and mathematically equivalent method of deriving the image 320 in the lower right quadrant 308 follows a method in accordance with the present invention. The aperture elements act as a collection of interferometers sensitive to spatial frequency components of the scene corresponding to the spacing between individual elements of the antenna aperture 312. Closely spaced elements are sensitive to low spatial frequencies, and widely spaced elements are sensitive to high spatial frequencies. Thus, the signals collected by the antenna elements measure the power distribution of the various spatial frequency components across the field of view of the aperture. The aperture elements are auto correlated 314 to generate what is known as the Modulation Transfer Function (MTF) 316 depicted schematically in the upper right quadrant 304. An advantage of this method is that samples of the spatial frequency components are integrated over an entire frame time, improving the signal-to-noise ratio. In addition, the MTF is in ideal form for the application of spatial filtering or other frequency-domain filtering to enhance the recovered image. The MTF 316 is then processed by an inverse Fourier transform 318 to recover an image of the scene 320.

It should be noted that the processes described above are performed on a per-range-line basis. In other words, the radar returns are range gated to divide up the radar data into a series of range bins. Each range bin is then processed in azimuth by the techniques depicted in FIG. 3. The processed azimuth strips of each range bin are then stacked together to form the full two-dimensional image of the scene.

Figure 4A:
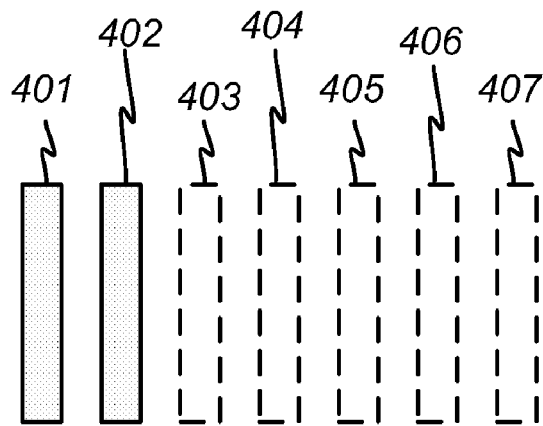
FIGS. 4A-C depict arrangements of a sparse array antenna including a minimally redundant array in accordance with the present invention.
Figure 4B:
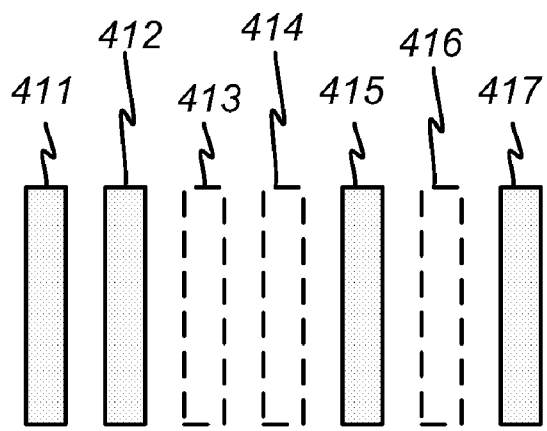
Figure 4C:
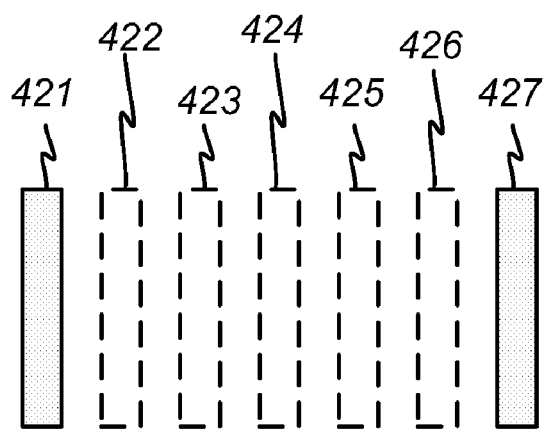

As discussed above with reference to the sparse array 312, the aperture elements can be thought of as a collection of interferometers sensitive to spatial frequency components corresponding to the spacing between various combinations of elements. Thus, it is readily apparent that a fully populated regular array would perform many redundant measurements of the low-spatial-frequency components of the field of view because there would be a large number of combinations of array elements having the minimum spacing. FIGS. 4A-C illustrate this concept.

FIG. 4A depicts a receive array aperture with just two elements 401 and 402 populated. This array would be sensitive only to low spatial frequency components corresponding to the spacing between elements 401 and 402. If all of the elements 401 through 407 were populated, note that there would be many combinations of elements with this same spacing, for example, 402 with 403, 403 with 404, and 406 with 407, among others. Thus, such an array would make many redundant measurements.

FIG. 4C, on the other hand is a receive aperture in which only the first and last elements, 421 and 427, are populated. This aperture would be sensitive only to high-spatial-frequency components of the scene corresponding to the large separation between elements 421 and 427. More particularly, the aperture of FIG. 4C would be responsive to spatial frequency components six times greater than that of FIG. 4A.

It is possible to construct an array aperture that is minimally redundant in that the number of populated array elements is reduced in such a way that no spatial frequency components are lost, and none is measured by more than one pair of array elements. Such a minimally redundant array (MRA) is depicted in FIG. 4B. Here, four elements are populated corresponding to slots 411, 412, 415, and 417. This MRA provides the same resolution as a fully populated seven-element array, measuring all spatial frequency components up to an upper limit set by the spacing of the two outermost elements 411 and 417. The combinations of array elements sensitive to spatial frequency components corresponding to various element separations are summarized below:

1) DC component: (411, 411), (412, 412), (415, 415), and (417, 417);
2) spacing of 1 unit: (411, 412);
3) spacing of 2 units: (415, 417);
4) spacing of 3 units: (412, 415);
5) spacing of 4 units (411, 415);
6) spacing of 5 units (412, 417); and
7) spacing of 6 units (411, 417).

Except for the DC spatial frequency components corresponding to elements with zero spacing, each spectral component is measured by only one combination of elements. Thus, an MRA array enables a reduction in antenna bulk by removing redundant elements without reducing the array's resolution. Conversely, for a given number of array elements, an MRA arrangement will enable increased resolution by maximizing the separation achievable between the two outermost elements. Of course, the concept of an MRA may be extended to arrays larger than seven elements. Such an MRA can be used with a radar imaging system in accordance with the present invention.

Figure 5:
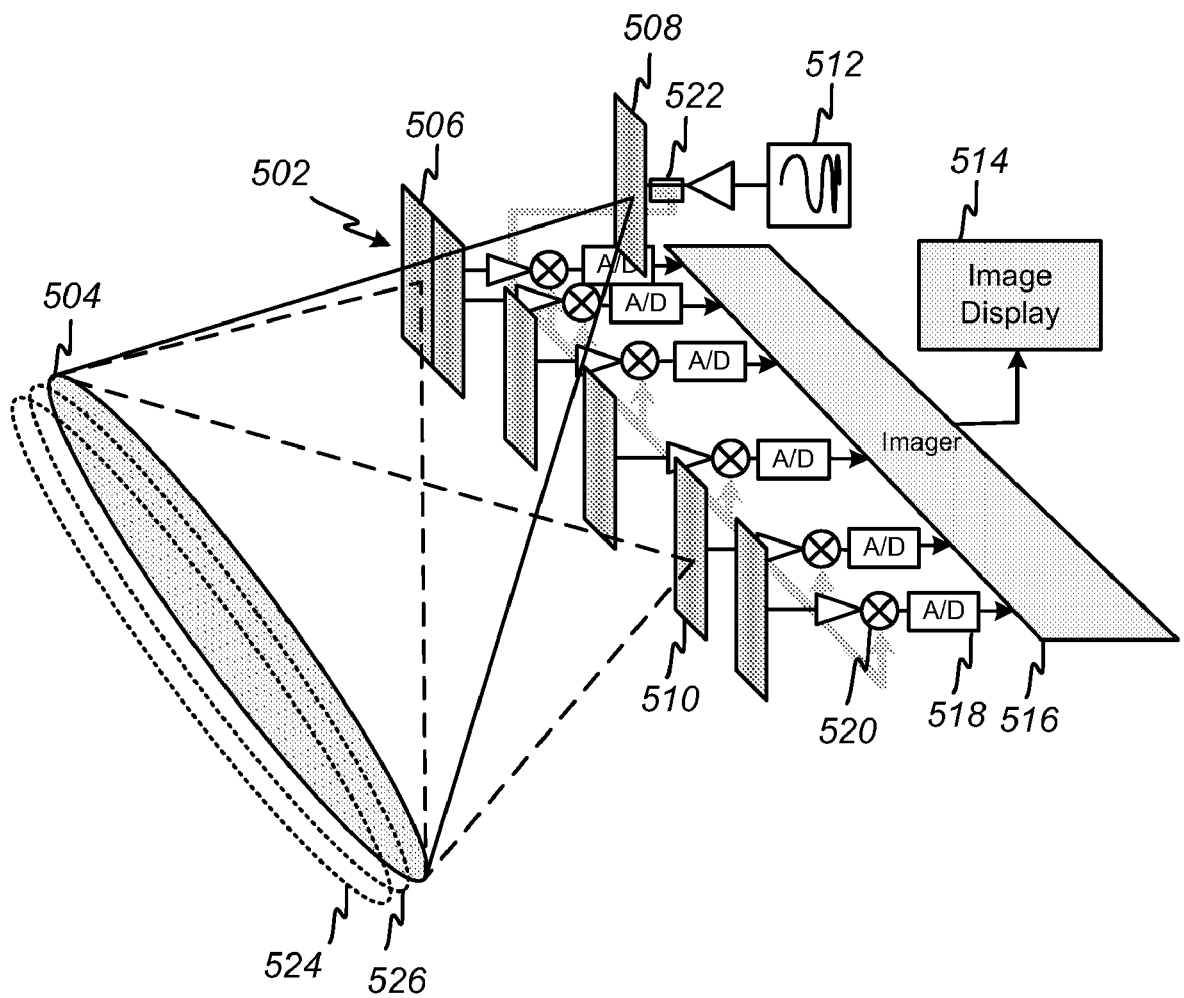
FIG. 5 depicts an embodiment of a forward-looking imaging radar including a minimally redundant receive array in accordance with the present invention.

FIG. 5 is a diagram of an embodiment of a radar imaging system employing an MRA in accordance with the present invention. A transmit antenna 508 having a broad-beam pattern is driven by a chirped pulsed waveform 512 or other suitable radar pulse. The transmitted radio-frequency energy illuminates a swath 504 of ground below and in front of the antenna. Reflections from scattering targets within the illuminated swath return to a minimally redundant receive array antenna 502. FIG. 5 depicts returns to two widely separated elements 506 and 510 of the receive array, illustrating the sensitivity of the receive array to relatively high spatial frequencies associated with small structures and fine details in the illuminated swath.

The signals measured by each of the receive array elements are de-chirped by mixing them 520 with a coupled sample 522 of the transmitted chirp waveform 512. The de-chirped signals are then digitized by analog-to-digital converters 518, and the digitized samples are sent to an image processor 516, described in more detail below with reference to FIG. 6. As the platform moves forward, new transmit pulses result in overlapping swaths 526 and 524 that can be integrated to provide multiple looks at scattering targets to improve the signal-to-noise ratio of the system.

Figure 6:
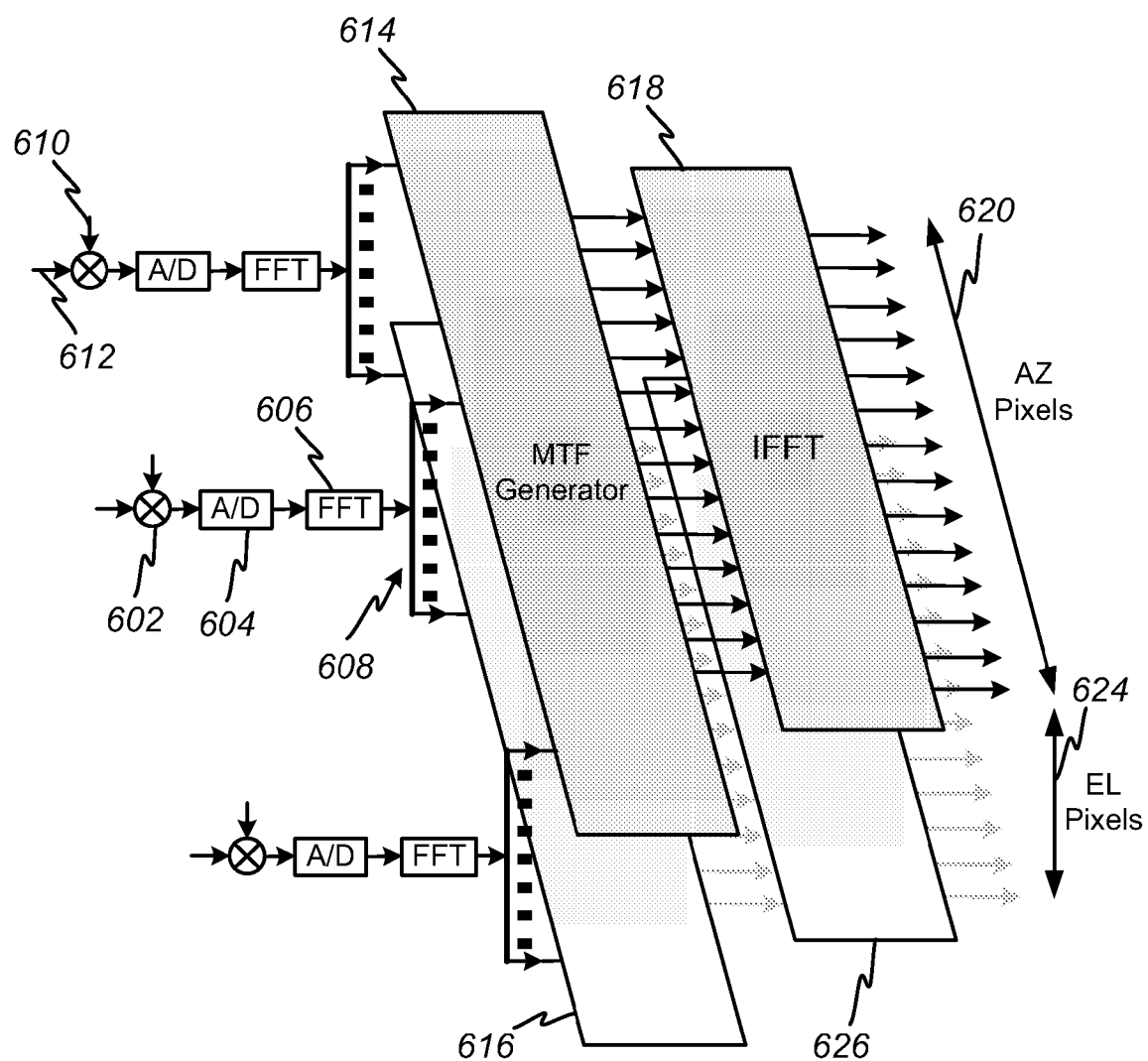
FIG. 6 depicts a schematic view of an image processing technique in accordance with the present invention.

FIG. 6 is a more detailed diagram of the image processing flow of a radar imaging system in accordance with the present invention. An incoming signal 612 from the receive array 502 (see FIG. 5) is de-chirped in a mixer 602 by application of the chirp waveform 610 used to transmit the radar pulse. The dechirped signal is digitized in an analog-to-digital converter 604 on a per-antenna-element basis. The digitized signals from the antenna array elements are then range gated using short-time-window fast Fourier transforms (FFTS) 606 to divide them into range bins, shown schematically at 608. Each range bin corresponds to a band of targets extending in the azimuth or cross-track direction but at the same range or along-track distance from the antenna. Each range bin is separately processed by the subsequent azimuth processing hardware. Note that all range bins may be processed in parallel by parallel azimuth processors, or the range-binned data may be stored and processed sequentially by a single azimuth processor to save hardware costs at the expense of a lower pulse repetition frequency (PRF). Each azimuth processor includes a Modulation Transfer Function (MTF) processor 614 and a Fourier transform processor 618 configured to perform an inverse FFT. The MTF processor 614 reads in the range-binned data from each of the elements of the receive antenna and performs an autocorrelation over the entire receive aperture. This has the effect of organizing by frequency the measured spatial frequency components of the illuminated range slice of the scene. The fact that the antenna is a minimally redundant array results in a spectrum in which low-spatial-frequency components are weighted less than they would be if acquired by a fully-populated array. The MTF processor 614 is adapted to apply configurable weighting factors to each of the frequency bins. These weighting factors could be used to compensate for the lack of redundant sampling of lower-frequency components, or more generally, could be used to enhance image features by spatial filtering according to well-known methods such as smoothing (enhancing low spatial frequency components) or edge sharpening (enhancing high spatial frequency components).

The weighted components of the MTF-processed signals are then sent to a Fourier processor 618 that performs an inverse Fourier transform to recover a row of azimuth pixels, indicated at 620. Parallel (or sequential) sets of azimuth processors, e.g., 616 and 626, process other range slices. The azimuth image lines 620 corresponding to each of the range or elevation bins 624 are stacked to form a two-dimensional image of the swath illuminated by the transmit antenna. Depending on the speed of the vehicle on which the antenna is mounted and the PRF rate of the radar, subsequent transmit pulses may illuminate swaths that partially overlap, resulting in range slices being imaged multiple times. These multiple looks at the range slices can be combined to improve the signal-to-noise ratio of the image.

Figure 7:
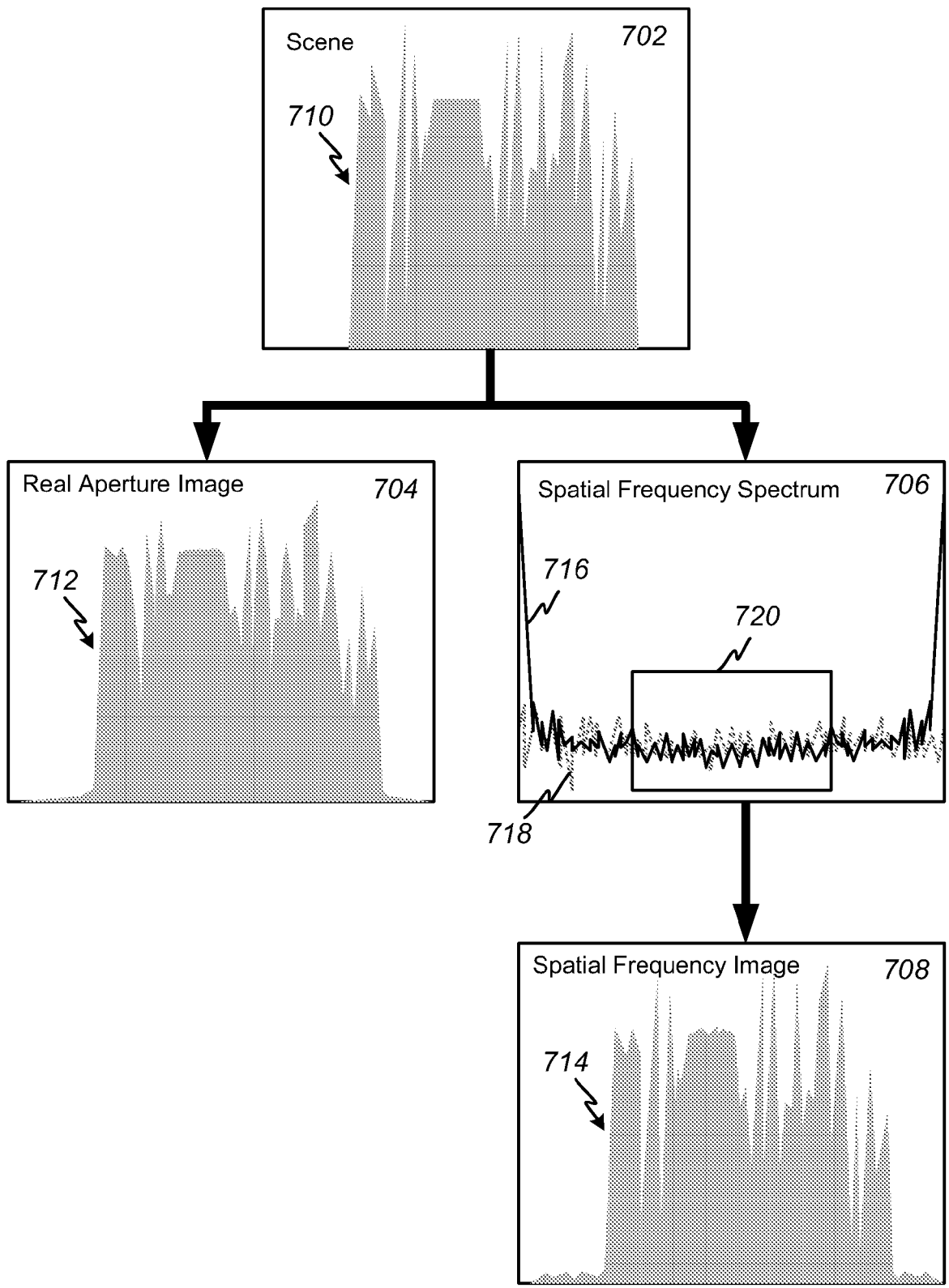
FIG. 7 shows simulated results of image processing according to techniques in accordance with the present invention.

FIG. 7 illustrates simulated image processing results using the spatial-frequency-processing method of the present invention compared with conventional pencil-beam processing. A range slice of a scene is depicted at 702 in which distance along the azimuth direction is plotted along a horizontal axis and the ideal intensity of radar returns is plotted along a vertical axis. The data 710 represents the return of an ideal system. Following the path on the left to image 704 represents conventional pencil-beam processing. Here, a narrow beam is scanned across the scene, and the intensity of the return 712 integrated across the scanning antenna is plotted as a function of scan angle.

On the right-hand side, the processing method of the present invention is illustrated. The signals arriving at the elements of the minimally redundant receive array are cross correlated, i.e., an autocorrelation of the entire aperture is performed, and the resulting amplitude 716 and phase 718 of the spatial frequency components of the scene is plotted in 706. Here, the wavenumber is plotted along a horizontal axis, and amplitude/phase angle is plotted along a vertical axis. The box labeled 720 shows a simple low-pass filter that acts as a spatial filter in this spatial frequency domain, illustrating the ease with which such processing may be applied.

Image 708 is reconstructed from the spatial frequency spectrum 706 by the application of an inverse Fourier transform to recover an intensity plot 714 as a function of distance along the azimuth direction. The images presented at 704 and 708 are largely similar, illustrating the mathematical equivalence of the two imaging methods. However, the image formed by the spatial frequency method in general shows a sharper and faster spatial variation capability because the image processing has the flexibility of weighting the spectral frequency components differently. Weights can be applied to exactly recover a pencil-beam image, but they can also be applied to enhance or suppress certain frequency components to bring out desired features of the scene image.

Figure 8:
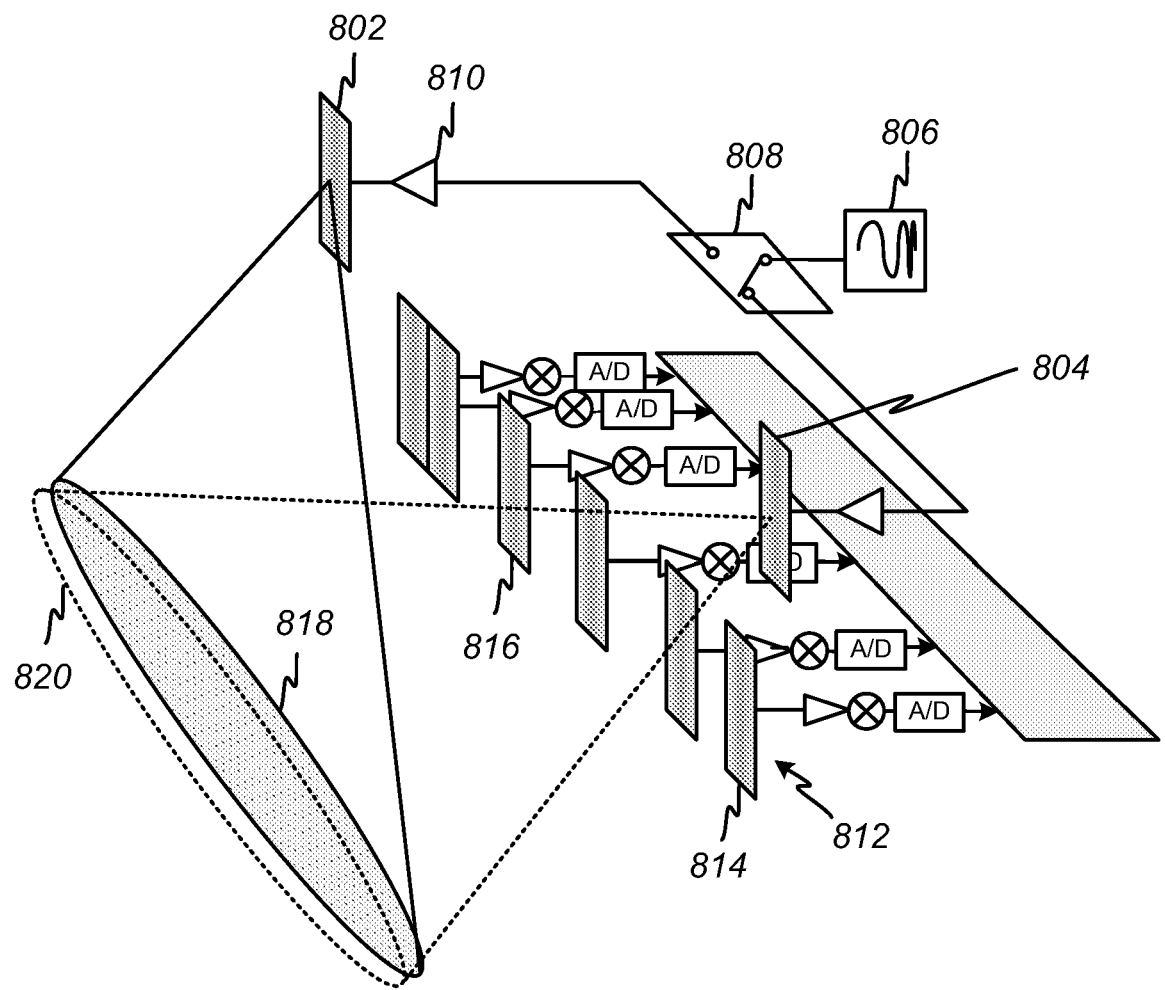
FIG. 8 depicts a block diagram of an alternative embodiment of an imaging radar in accordance with the present invention having two transmit antennas.

FIG. 8 depicts an alternative embodiment of imaging radar in accordance with the present invention that provides two transmit antennas configured to enable the generation of three-dimensional, stereoscopic radar images. Two spatially separated transmit antennas 802 and 804 are configured to alternately transmit radar waveforms to illuminate the scene. A waveform generator 806 is routed through a switch 808 that can direct a transmit radar waveform alternatively to a first transmit antenna 802 or to a second transmit antenna 804. The switch is operated such that alternate pulses are directed to alternate antennas. Thus, a first waveform transmitted by the first transmit antenna 802 illuminates a first swath 818. The switch 808 is then moved to a second position, and the second transmit antenna 804 illuminates a second swath 820 having substantial overlap with the first swath 818. Thus, targets in the overlap region of the first swath 818 and the second swath 820 are illuminated sequentially from two angles. The returns from each of the transmitted waveforms are received by the receive array 812, comprised of individual receive elements, e.g., 814 and 816. A radar image of the scene is then generated as described previously. However, differences in the returns from the two angles enable the generation of a three-dimensional stereoscopic image. The depth of the three-dimensional resolution is a function of the separation of the two transmit antennas. When the transmit antennas are separated in the azimuth direction, as shown in FIG. 8, the stereoscopic resolution is obtained in the azimuth direction. Alternatively, the two transmit antennas could be separated in elevation with corresponding stereoscopic resolution in the elevation direction. Of course, some stereoscopic resolution in the elevation dimension is obtainable in any case due to the along-track motion of the platform that results in overlapping swaths imaged from different range/elevation angles. Of course, other arrangements of the transmit antennas are possible, and systems may also include more than two transmit antennas to achieve three-dimensional resolution in more than one direction. Such systems would also fall within the scope and spirit of the present invention.

Thus, a radar imaging system is achieved that directly measures the spatial frequency components of a scene using interfereometry applied along the cross-track dimension. Range gating is used in the along-track dimension to divide the return from an illuminated swath into multiple range bins that may be processed independently. The system provides an improved signal-to-noise ratio and lends significant flexibility to the image formation process, improving the quality of the radar imaging. An embodiment of the radar system comprising two or more transmit antennas further enables the generation of three-dimensional stereoscopic radar images. Those skilled in the art will likely recognize further advantages of the present invention, and it should be appreciated that various modifications, adaptations, and alternative embodiments thereof may be made within the scope and spirit of the present invention. The invention is further defined by the following claims.

What is claimed is:

1. A radar imaging system comprising:
   a transmit antenna adapted to transmit radar waveforms to illuminate a target region extending in a range direction and in an azimuth direction;
   a receive antenna divided into a plurality of array segments, wherein the receive antenna is adapted to receive a radar return from the target region and to generate a plurality of return signals associated with corresponding ones of the plurality of array segments;
   a range processor adapted to receive the plurality of return signals from the receive antenna and to divide them into a plurality of range slices, wherein each one of the plurality of range slices comprises a plurality of azimuth signals associated with corresponding ones of the plurality of array segments;
   at least one modulation-transfer-function (MTF) processor adapted to receive the plurality of azimuth signals from one of the plurality of range slices at a time and to auto-correlate the plurality of azimuth signals to generate a plurality of spatial-frequency signals;
   at least one Fourier transform processor adapted to receive the plurality of spatial-frequency signals and to generate an inverse Fourier transform of the spatial-frequency signals to generate an azimuth image slice associated with the one of the plurality of range slices received by the at least one MTF processor; and
   an image processor adapted to combine azimuth images slices associated with ones of the plurality of range slices to create a two-dimensional radar image.

2. The radar imaging system of claim 1, wherein the plurality of array segments of the receive antenna comprise a sparse linear array whereby ones of the plurality of array segments are positioned along a straight line such that spacings between pairs of the plurality of range segments are irregular.

3. The radar imaging system of claim 2, wherein the sparse linear array is further adapted to comprise a minimally redundant array whereby a number of pairs of array segments having equal spacing is minimized.

4. The radar imaging system of claim 1, wherein the at least one MTF processor further comprises a weighting unit adapted to apply a plurality of complex weighting factors to corresponding ones of the plurality of spatial-frequency signals.

5. The radar imaging system of claim 4, wherein the plurality of complex weighting factors applied by the weighting unit is adapted to low-pass filter the plurality of spatial-frequency signals.

6. The radar imaging system of claim 4, wherein the plurality of complex weighting factors applied by the weighting unit is adapted to high-pass filter the plurality of spatial-frequency signals.

7. The radar imaging system of claim 4, wherein the plurality of complex weighting factors applied by the weighting unit is adapted to band-pass filter the plurality of spatial-frequency signals.

8. The radar imaging system of claim 1, wherein the range processor further comprises a range-Fourier-transform processor adapted to perform short-time-window fast Fourier transforms of the plurality of return signals to divide the plurality of return signals into the plurality of range slices.

9. The radar imaging system of claim 1, wherein:
   the at least one MTF processor further comprises N MTF processors; and
   the at least one Fourier-transform processor further comprises N Fourier-transform processors;
   wherein N is a positive integer corresponding to a number of range slices generated by the range processor; and
   wherein the N MTF processors and the N Fourier transform processors are adapted to parallel process the plurality of azimuth signals from N range slices generated by the range processor.

10. A radar imaging system comprising:
    a transmit antenna adapted to transmit radar waveforms to illuminate a target region extending in a range direction and in an azimuth direction;
    a receive antenna divided into a plurality of array segments, wherein:
       the plurality of array segments are adapted to comprise a minimally redundant array whereby a number of pairs of array segments having equal spacing is minimized; and
       the minimally redundant array is adapted to receive a radar return from the target region and to generate a plurality of return signals associated with corresponding ones of the plurality of array segments;
    a range processor adapted to receive the plurality of return signals from the minimally redundant array and to divide them into a plurality of range slices, wherein each one of the plurality of range slices comprises a plurality of azimuth signals associated with corresponding ones of the plurality of array segments;
    a modulation-transfer-function (MTF) processor adapted to receive the plurality of azimuth signals from one of the plurality of range slices at a time and to auto-correlate the plurality of azimuth signals to generate a plurality of spatial-frequency signals;
    a Fourier transform processor adapted to receive the plurality of spatial-frequency signals and to generate an inverse Fourier transform of the spatial-frequency signals to generate an azimuth image slice associated with the one of the plurality of range slices received by the MTF processor; and an image processor adapted to combine azimuth images slices associated with ones of the plurality of range slices to create a two-dimensional radar image.

11. The radar imaging system of claim 10, wherein the MTF processor further comprises a weighting unit adapted to apply a plurality of complex weighting factors to corresponding ones of the plurality of spatial-frequency signals.

12. The radar imaging system of claim 11, wherein the plurality of complex weighting factors applied by the weighting unit is adapted to low-pass filter the plurality of spatial-frequency signals.

13. The radar imaging system of claim 11, wherein the plurality of complex weighting factors applied by the weighting unit is adapted to high-pass filter the plurality of spatial-frequency signals.

14. The radar imaging system of claim 11, wherein the plurality of complex weighting factors applied by the weighting unit is adapted to band-pass filter the plurality of spatial-frequency signals.

15. The radar imaging system of claim 10, wherein the range processor further comprises a range-Fourier-transform processor adapted to perform short-time-window fast Fourier transforms of the plurality of return signals to divide the plurality of return signals into the plurality of range slices.

16. The radar imaging system of claim 10, further comprising

N modulation-transfer-function (MTF) processors; and

N Fourier-transform processors;

wherein N is a positive integer corresponding to a number of range slices generated by the range processor; and wherein the N MTF processors and the N Fourier transform processors are adapted to parallel process the plurality of azimuth signals from N range slices generated by the range processor.

17. In a radar imaging system comprising a transmit antenna and a receive antenna array comprising a plurality of segments, a method of creating a radar image comprises:

transmitting radar waveforms from the transmit antenna to illuminate a target area;

receiving a radar echo at the receive antenna array that produces a plurality of return signals from corresponding ones of the plurality of segments of the receive antenna array;

range gating the plurality of return signals to divide them into a plurality of range slices, wherein each one of the plurality of range slices comprises a plurality of azimuth signals associated with corresponding ones of the plurality of segments of the receive antenna array;

performing an autocorrelation of the plurality of azimuth signals associated with a first one of the plurality of range slices to generate a first modulation transfer function comprising a first plurality of spatial-frequency components;

performing an inverse Fourier transform of the first plurality of spatial-frequency components to generate a first azimuth image line associated with the first one of the plurality of range slices;

repeating the steps of performing an autocorrelation and performing an inverse Fourier transform of a plurality of azimuth signals associated with one of the plurality if range slices until all of the range slices have been processed;

arranging azimuth image lines associated with ones of the plurality of range slices to form a two-dimensional image of the target area.

18. The method of claim 17, wherein the step of performing an autocorrelation of the plurality of azimuth signals further comprises applying complex weighting factors to the modulation transfer function generated from the plurality of azimuth signals to effect a spatial filtering transformation of the modulation transfer function.

19. The method of claim 18, wherein the step of applying complex weighting factors further comprises low-pass filtering the modulation transfer function.

20. The method of claim 18, wherein the step of applying complex weighting factors further comprises high-pass filtering the modulation transfer function.

21. The method of claim 18, wherein the step of applying complex weighting factors further comprises band-pass filtering the modulation transfer function.

22. The method of claim 17, wherein the step of range gating the plurality of return signals further comprises performing short-time-window fast Fourier transform on the plurality of return signals to divide the plurality of return signals into the plurality of range slices.

23. The method of claim 17, wherein the step of repeating the steps of performing an autocorrelation and performing an inverse Fourier transform is performed in parallel such that each one of the plurality of range slices is processed in parallel.

24. A three-dimensional radar imaging system comprising:

at least a first transmit antenna and a second transmit antenna adapted to alternately transmit radar waveforms to illuminate a target region extending in a range direction and in an azimuth direction wherein:

the first transmit antenna illuminates the target region from a first angle; and the second transmit antenna illuminates the target region from a second angle;

a receive antenna divided into a plurality of array segments, wherein the receive antenna is adapted to receive a radar return from the target region and to generate a plurality of return signals associated with corresponding ones of the plurality of array segments;

a range processor adapted to receive the plurality of return signals from the receive antenna and to divide them into a plurality of range slices, wherein each one of the plurality of range slices comprises a plurality of azimuth signals associated with corresponding ones of the plurality of array segments;

a modulation-transfer-function (MTF) processor adapted to receive the plurality of azimuth signals from one of the plurality of range slices at a time and to auto-correlate the plurality of azimuth signals to generate a plurality of spatial-frequency signals;

a Fourier transform processor adapted to receive the plurality of spatial-frequency signals and to generate an inverse Fourier transform of the spatial-frequency signals to generate an azimuth image slice associated with the one of the plurality of range slices received by the MTF processor; and an image processor adapted to combine azimuth images slices associated with ones of the plurality of range slices from the first transmit antenna and azimuth image slices associated with ones of the plurality of range slices from the second transmit antenna to create a three-dimensional radar image.

25. The three-dimensional radar imaging system of claim 24, wherein the first transmit antenna and the second transmit antenna are separated in a substantially horizontal direction.

26. The three-dimensional radar imaging system of claim 24, wherein the first transmit antenna and the second transmit antenna are separated in a substantially vertical direction.

27. The three-dimensional radar imaging system of claim 24, wherein the plurality of array segments of the receive antenna comprise a sparse linear array whereby ones of the plurality of array segments are positioned along a straight line such that spacings between pairs of the plurality of range segments are irregular.

28. The three-dimensional radar imaging system of claim 27, wherein the sparse linear array is further adapted to comprise a minimally redundant array whereby a number of pairs of array segments having equal spacing is minimized.

29. The three-dimensional radar imaging system of claim 24, wherein the range processor further comprises a range-Fourier-transform processor adapted to perform short-time-window fast Fourier transforms of the plurality of return signals to divide the plurality of return signals into the plurality of range slices.

* * * * *